US009762687B2

(12) United States Patent
Poupko et al.

(10) Patent No.: US 9,762,687 B2
(45) Date of Patent: Sep. 12, 2017

(54) CONTINUITY OF CONTENT (71) Applicant: Cisco Technology, Inc., San Jose, CA (US)

(72) Inventors: Avraham Poupko, Jerusalem (IL); Hillel Solow, Beit Shemesh (IL); Perry Smith, Maale Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 14/407,969

(22) PCT Filed: Jun. 17, 2013

(86) PCT No.: PCT/IB2013/054948
§ 371 (c)(1),
(2) Date: Dec. 15, 2014

(87) PCT Pub. No.: WO2013/190446
PCT Pub. Date: Dec. 27, 2013

(65) Prior Publication Data
US 2015/0142798 A1 May 21, 2015

(30) Foreign Application Priority Data

Jun. 18, 2012 (GB) .................................. 1210758.7

(51) Int. Cl.
*G06F 17/30* (2006.01)
*H04L 29/08* (2006.01)
(52) U.S. Cl.
CPC ........ *H04L 67/22* (2013.01); *G06F 17/30053* (2013.01); *H04L 67/26* (2013.01); *H04L 67/2804* (2013.01); *H04L 67/306* (2013.01)
(58) Field of Classification Search
CPC ........................ H04L 67/306; H04N 21/41407
(Continued)

(56) References Cited

U.S. PATENT DOCUMENTS

2003/0055977 A1  3/2003  Miller
2003/0079057 A1  4/2003  Ruskin
(Continued)

FOREIGN PATENT DOCUMENTS

WO   WO 03/032173      4/2003
WO   WO 2005/109829   11/2005
(Continued)

OTHER PUBLICATIONS

Speech Modules, Advanced Speech Recognition Technologies, 2010.
(Continued)

*Primary Examiner* — Baoquoc N To
(74) *Attorney, Agent, or Firm* — Samuel M. Katz (57) ABSTRACT A method and system for media consumption are described. The method including tagging each one of a plurality of content items with at least one metadata tag, the metadata tag including a descriptor of at least one topical attribute describing the content item, the plurality of content items being adapted for consumption on a plurality of user devices, wherein the plurality of content items are provided in multiple file formats; acquiring a history of user consumption of the plurality of content items on a plurality of user devices associated with a single user; storing a user record including the acquired user history, a plurality of metadata tags associated with user consumed content, and including a list of devices comprising the plurality of user devices associated with a single user; building a playlist based, at least in part, on the following criteria, wherein each content item which is listed on the playlist has at least one tag which is also one of a plurality of tags already stored in the user record: a) including a content item which has been started but not completely consumed, b) not including content items marked in the acquired history as being completely consumed, unless the content items have changed with respect to the version consumed, and c)
(Continued)

including content items which have not been consumed; selecting at least one content item from the playlist; and pushing the selected at least one content item to at least one of the plurality of user devices associated with a single user, wherein if the selected at least one content item is not suitable for consumption on the at least one of the plurality of user devices, then a next item in the playlist is pushed to the least one of the plurality of user devices.

15 Claims, 4 Drawing Sheets

(58) Field of Classification Search
USPC ......... 707/E17.009, 751, 913, 740; 709/203, 709/217, 230, 231
See application file for complete search history.

(56) References Cited

U.S. PATENT DOCUMENTS

| | | | |
|---|---|---|---|
| 2006/0195462 A1* | 8/2006 | Rogers | .............. G06F 17/30766 |
| 2007/0078993 A1 | 4/2007 | Issa | |
| 2007/0245376 A1* | 10/2007 | Svendsen | ........... H04N 7/17318 |
| | | | 725/46 |
| 2007/0282990 A1 | 12/2007 | Kumar et al. | |
| 2008/0034095 A1 | 2/2008 | Richardson et al. | |
| 2008/0183645 A1 | 7/2008 | Burger et al. | |
| 2009/0216351 A1 | 8/2009 | Van Horck et al. | |

FOREIGN PATENT DOCUMENTS

| | | |
|---|---|---|
| WO | WO 2005/125202 | 12/2005 |
| WO | WO 2006/090340 | 8/2006 |
| WO | WO 2007/067863 | 6/2007 |

OTHER PUBLICATIONS

Van Rijsbergen, C.J., Information Retrieval, Information Retrieval Group; 1975; University of Glasgow, Automatic Text Analysis, Chapter 2, Information Retrieval Can be found at: www.dcs.gla.ac.uk/Keith/pdf/Chapter2.pdf.
International Search Report, Oct. 24, 2013.
GB Search and Examination Report, Oct. 12, 2012.

* cited by examiner

CONTINUITY OF CONTENT

The present application is a 35 USC §371 application of PCT/IB2013/054948, filed on 17 Jun. 2013 and entitled "Continuity of Content", which was published in the English language with International Publication Number WO 2013/190446, and which claims the benefit of priority from GB Patent Application GB 1210758.7 of NDS Limited, filed 18 Jun. 2012.

FIELD OF THE INVENTION

The present invention relates to a various devices used to consume content, and more specifically to a method and system for ensuring continuity of data across those devices.

BACKGROUND OF THE INVENTION

Web browsers and some web sites may operate tracking software, which may note that a person is browsing the website and viewing articles, news stories, and so forth, about a particular topic.

News aggregator websites identify and present news articles posted on websites topically.

A method for automatic text analysis is described in "Automatic Text Analysis," Chapter 2, *Information Retrieval*, C. J. van Rijsbergen, found online at: www.dcs.gla.ac.uk/Keith/pdf/Chapter2.pdf.

A method for speech-to-text transformation is described at www.speechmodules.com/technology.html.

Image and facial recognition techniques are known in the art.

The following references are believed to reflect the state of the art:

US 2008/0183645 of Burger, et al.;
US 2008/0034095 of Richardson, et al.;
US 2007/0282990 of Kumar, et al.;
US 2003/0079057 of Ruskin, et al.
US 2003/0055977 of Miller;
WO 2005/109829 of Koninklijke Philips Electronics N.V.;
WO 03/032173 of the University of Wollongong; and
WO 2005/125202 of NDS Ltd.

SUMMARY OF THE INVENTION

The present invention, in certain embodiments thereof, seeks to provide an improved method and system for ensuring continuity of data across user devices and media types.

There is thus provided in accordance with an embodiment of the present invention a method for media consumption, the method including tagging each one of the acquired user history a plurality of content items with at least one metadata tag, the metadata tag including a descriptor of at least one topical attribute describing the content item, the plurality of content items being adapted for consumption on a plurality of user devices, wherein the plurality of content items are provided in multiple file formats, acquiring a history of user consumption of the plurality of content items on a plurality of user devices associated with a single user, storing a user record including the acquired user history, a plurality of metadata tags, each tag comprising a descriptor of at least one topical attribute describing the content item that is associated with user consumed content, and a list of devices including the plurality of user devices associated with a single user, building a playlist based, at least in part, on the following criteria, wherein each content item which is listed on the playlist has at least one tag which is also one of a plurality of tags already stored in the user record including a content item which has been started but not completely consumed, not including content items marked in the acquired history as being completely consumed, unless the content items have changed with respect to the version consumed, and including content items which have not been consumed, selecting at least one content item from the playlist, and pushing the selected at least one content item to at least one of the plurality of user devices associated with a single user, wherein if the selected at least one content item is not suitable for consumption on the at least one of the plurality of user devices, then a next item in the playlist is pushed to the least one of the plurality of user devices.

Further in accordance with an embodiment of the present invention each one of the content items comprises a content item in one of the following formats AVI, DIV, MP4, MPEG, MPG, WMV, and RM files, MP3, M4A, MIDI, and WAV files, and HTML, XML, DOC, and PDF files.

Still further in accordance with an embodiment of the present invention at least one of the plurality of user devices associated with the single user comprises one of an e-reader device, a tablet computer, a smart phone, a car radio, a vehicular based infotainment center, an Internet radio, a television set, a personal computer, and a personal video recorder.

Additionally in accordance with an embodiment of the present invention metadata tags are stored in a database of metadata tags.

Moreover in accordance with an embodiment of the present invention the user record is stored at a remote server.

Further in accordance with an embodiment of the present invention the playlist is built at a remote server.

Still further in accordance with an embodiment of the present invention the playlist is customized according to the least one of the plurality of user devices associated with a single user.

There is also provided in accordance with another embodiment of the present invention a system for media consumption, the system including a metadata tagger which tags each one of a plurality of content items with at least one metadata tag, the metadata tag including a descriptor of at least one topical attribute describing the content item, the plurality of content items being adapted for consumption on a plurality of user devices, wherein the plurality of content items are provided in multiple file formats, a user history of user consumption of the plurality of content items on a plurality of user devices associated with a single user, a store for storing a user record including the acquired user history, a plurality of metadata tags including a descriptor of at least one topical attribute describing the content item that is associated with user consumed content, and a list of devices including the plurality of user devices associated with a single user, a playlist builder for building a playlist based, at least in part, on the following criteria, wherein each content item which is listed on the playlist has at least one tag which is also one of a plurality of tags already stored in the user record including a content item which has been started but not completely consumed, not including content items marked in the acquired history as being completely consumed, unless said content items have changed with respect to the version consumed, and including content items which have not been consumed, a selector to select at least one content item from the playlist, and a content pusher to push the selected at least one content item to at least one of the plurality of user devices associated with a single user, wherein if the selected at least one content item is not suitable for consumption on the at least one of the plurality of user devices, then a next item in the playlist is pushed to the least one of the plurality of user devices.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
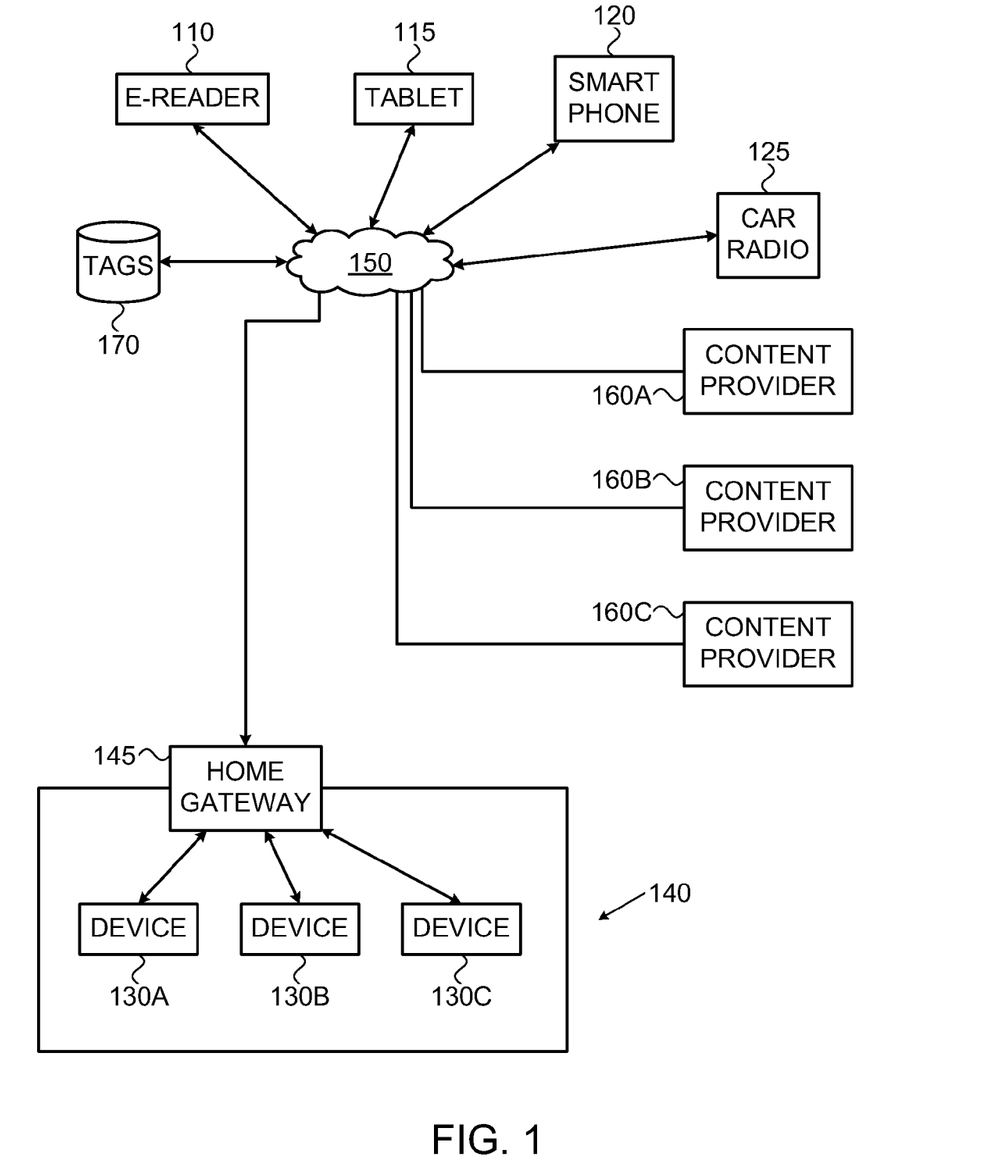
FIG. 1 is a simplified illustration of a high level overview of a system constructed and operative in accordance with an embodiment of the present invention.

Reference is now made to FIG. 1, which is a simplified illustration of a high level overview of a system constructed and operative in accordance with an embodiment of the present invention.

Before turning to details of FIG. 1, a story describing the operation of an embodiment of the present invention will help to provide the reader with a high-level, 'big picture' of embodiments of the present invention. The story which follows is provided by way of example. Persons of skill in the art, having read the present specification and claims will no doubt be able to think of other scenarios in which the embodiment described in the following story, as well as other embodiments of the present invention, may be implemented.

As is well known, browsers and some web sites may operate tracking software, which may note that a person, who, for the sake of the present story will be called John, is browsing the website and viewing articles, news stories, and so forth, about a particular topic. For instance, John's viewing may indicate that John is interested in an election for governor of John's state. When John browses a particular news story about the gubernatorial election, say on www.AnyStateNews.com, John might see a particular story. Later that evening, when John watches the news on television, John may see the same news story. Still later, if John is in his car, he may hear the same news story a third time. Still later, as John is listening to a podcast on his desktop computer, John may hear the same news story yet a fourth time. Later on, before retiring for the evening, John may wish to browse the local newspaper on his e-Reader, and he may see the same news story a fifth time.

The next day, as John drives to work, he may hear an interview with one of the two candidates in the election. When John arrives at work, he turns off his car and stops listening to the interview. At a later time, John may seek out the remainder of the interview, either in an audio format, a video format or a text based format, in order to hear/see/read the conclusion of the interview.

It is appreciated that the continuity of content provided in the system described herein is contextually based, and not time based. The term "continuity of content" is understood to mean that the user continues to experience and consume either the same content item or other content items which are related in some fashion to an original content item. For example, in some prior art systems, John may be watching the news on a device, and may take his "device-to-go" with him in order to continue watching the news, from where he left off. Embodiments of present invention as described herein enable John to continue consuming a variety of different content items which are available for consumption across a variety of different formats (i.e. media formats, as mentioned below, such as video, audio, and text, and therefore, consequently, differing media file formats as well). In other words, if John is listening to a story on the radio, content may be pushed to John at various times during the day. Depending on what devices John is using, John may be pushed audio content to an audio playing device, video content to a video playing device, and text content to a text displaying device. However, all three of the audio, video, and text content will be somehow related to the original story that John was listening to on the radio.

Because of the variety of forms and formats which may be used to present the same or closely related content, (e.g., as noted above, it may be possible to hear an interview, see the interview (which typically includes hearing the interview as part of the experience of 'seeing'), or read a transcript of the interview), these various forms of partaking of the content are referred to hereinafter in the present specification and claims as "consuming the content"—regardless of the form of the content. The term "consuming the content" is used in this sense in all of its grammatical forms (for instance: consumable content, consume the content, etc.).

Consumable content items are understood to include content items which are consumable on widely differing platforms, but not necessarily be limited to the following formats:

video-media files, for example, and without limiting the generality of the foregoing, as AVI, DIV, MP4, MPEG, MPG, WMV, and RM files, as well as streaming video files;

audio-media files, for example, and without limiting the generality of the foregoing, MP3, M4A, MIDI, and WAV files, as well as streaming audio files; and text-based media files, for example, and without limiting the generality of the foregoing, HTML, XML, DOC, and PDF files.

Other consumable content items may comprise radio or television broadcasts.

The term "play", in all of its grammatical forms, as used herein is understood in the sense of render or making palpable to at least one human sense. Thus, a video clip which is "played" is rendered visible (i.e. viewable) in player software and, typically, rendered audible by the same player software. The player software is typically resident on the consumer device. Note that the terms "play", "render", and "consume" may all be used interchangeably herein in their various grammatical forms.

FIG. 1 depicts various consumer devices which are operative to "play" consumable content items.

Mobile consumer devices may include, but are not limited to e-reader devices 110, tablet computers 115, smart phones 120, car radios 125 and other vehicular based infotainment centers, Internet radios (not depicted) and so forth.

Non-mobile (typically home-based) devices may include television sets, personal computers (both mobile computers, such as laptops, and non-mobile computers, such as desktop computers), personal video recorders, etc. For ease of depiction, these are depicted in FIG. 1 as "devices" 130*a*, 130*b*, 130c. The devices 130a, 130b, 130c are typically located within a home network 140, depicted herein as comprising a home gateway 145 as an interface between the home network 140 and the outside world. One example of a home gateway 145 would be the Jungo Residential Gateway, commercially available from Jungo, 1 Hamachshev Street, P.O. Box 8493, Netanya 42504, Israel.

It is appreciated that although the devices 130a, 130b, 130c are depicted within a home network 140, the devices 130a, 130b, 130c may be within a work network, or a public network, or any other appropriate network. Accordingly, in-lieu of the home gateway 145, a firewall, a modem/router, or other appropriate apparatus interfacing between a closed network and a wider area network (such as, but not limited to, the Internet) may be used.

The home network 140 (or other appropriate network, as noted above) is connected (via a gateway such as the home gateway 145) to a network 150 such as the Internet, an intranet, wide- or metropolitan-area network. Various content providers 160a, 160b, 160c are also connected to the network 150. The e-reader devices 110, tablet computers 115, smart phones 120, car radios 125 and other vehicular based infotainment centers, Internet radios (not depicted), and so forth are also connected to the network 150. Persons of skill in the art will appreciate that, particularly in the case of car radios 125, the network 150 may comprise a broadcast network. Additionally, the network may comprise a combination of IP, broadcast, and other networks.

The content providers 160a, 160b, 160c provide consumable content items to the various mobile devices (the e-reader devices 110, tablet computers 115, smart phones 120, car radios 125 and other vehicular based infotainment centers, Internet radios (not depicted)) and non-mobile devices 130a, 130b, and 130c. As will be explained below in greater detail, each content item is associated with at least one metadata tag. A database of metadata tags 170 is available on the network, so that the content providers 160a, 160b, 160c are able to utilize the same metadata tags for tagging content items which share at least one topical attribute.

The system of FIG. 1 presumes the following:
There exists an environment consisting of multiple media playback devices (e.g. 110, 115, 120, 125, 130a, 130b, and 130c) some of which may be bound to a specific user, while others are shared by many users;
The multiple media playback devices (e.g. 110, 115, 120, 125, 130a, 130b, and 130c) may have local wireless connectivity (e.g. Bluetooth, Wi-Fi); and
The multiple media playback devices (e.g. 110, 115, 120, 125, 130a, 130b, and 130c) may have Internet connectivity.
Content for consumption on these devices is provided by the content providers 160a, 160b, 160c.
As already mentioned above, the content for consumption may include, but not be limited to Audio, Video, Text, HTML, etc.;
As already mentioned above, the content for consumption has associated metadata tags. The metadata tags may be any one or more of:
carried with the content;
accessible via the internet using a content ID; and
implicitly discernible using various media analysis methods, for example, and without limiting the generality of the foregoing:
Textual analysis of text articles to extract keywords which are significant to the article. A method for automatic text analysis is described at www.dcs.gla.ac.uk/Keith/pdf/Chapter2.pdf;
Speech-to-text transformation on audio from podcasts, radio programs, or video content, followed by aforementioned textual analysis. A method for speech-to-text transformation is described at www.speechmodules.com/technology.html; and
Image and/or facial recognition on pictures in articles and on video, to determine significant entities in a news story. Image and facial recognition techniques are known in the art.

The system of FIG. 1 further allows for the existence of a recommendation system (not depicted). It is appreciated, however, that the recommendation system is an optional component within the system of FIG. 1.

The recommendation system may use a user profile that is used to pick appropriate content for the user (examples of this type of recommendation system are well known, for example and without limiting the generality of the foregoing: Genius, and the YouTube recommendation systems); and The user profile/user content consumption history information may be maintained in a remote server.

Figure 2:
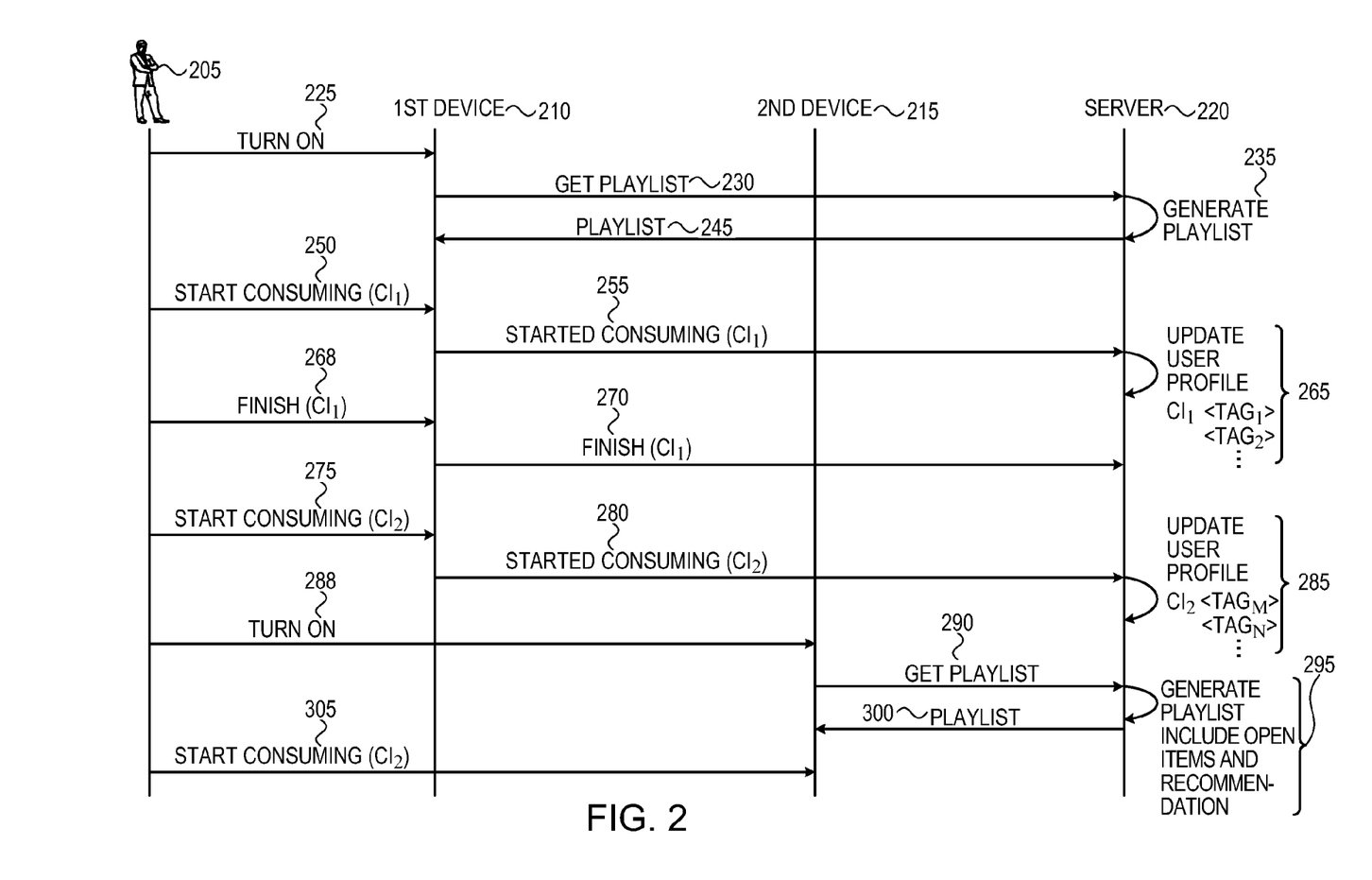
FIG. 2 is a diagram depicting the flow of data and events through devices in the system of FIG. 1.

Reference is now made to FIG. 2, which is a diagram depicting the flow of data and events through devices in the system of FIG. 1. A user 205 is depicted on the top-left side of FIG. 2. A vertical line descending from the user 205 indicates the passage of time. Horizontal arrows flowing out of the vertical line descending from the user 205 indicate the flow of user 205 actions towards either a first device 210 or a second device 215. The first device 210 and the second device 215 typically each comprise one of the multiple media playback devices (e.g. 110, 115, 120, 125, 130a, 130b, and 130c). At various times the first device 210 and the second device 215 communicate with a server 220. The server 220 is typically located remotely to one of the multiple media playback devices (e.g. 110, 115, 120, 125, 130a, 130b, and 130c).

The server 220:
Holds the user profile and consumption history. Alternatively, the user profile and consumption history may be stored over many servers or may be held on a user device. Holding the user profile and consumption history entails storing content consumption data as well as determining the user profile based on that data;
Provides recommendations for related or similar content by creating a content playlist; and
Provides the client with profile information suitable for making local content choices, where relevant.

The multiple media playback devices (e.g. 110, 115, 120, 125, 130a, 130b, and 130c) maintain a database (not depicted) of user 205 consumption history (and user profile information) which is ultimately uploaded to the server 220. It is appreciated that uploading the user 205 consumption history may be performed by the device (e.g. (e.g. 110, 115, 120, 125, 130a, 130b, and 130c) using known techniques, such as, and not limited to:
using its own device internet connection if present; and
via a connection to some external device (e.g. mobile phone, PC, car radio, . . . ).

Returning to the discussion of FIG. 2, the user 205 turns on (step 225) the first device 210. Alternatively, the user 205 may begin using the first device 210 after a hiatus of non-use, or after the first device 210 was in stand-by mode, and so forth. The first device 210 sends a get playlist request (step 230) to the server 220. The server 220 generates a playlist (step 235) for the first device 210. The playlist is sent (step 245) from the server 220 to the first device 210. When the user 205 is ready, the user starts to consume (step 250) a first content item, designated in FIG. 2 as $CI_1$. The first device 210 notifies the server 220 that the user 205 has started consuming $CI_1$ (step 255). In some embodiments of the present invention, there might be a delay before executing step 255. A delay would enable the system to take into account the user changing from consuming $CI_1$ to some other activity—by way of example, the user 205 may not want to hear the currently playing song, see the currently playing video clip, or so forth, and may change to a different activity within the delay lag time (e.g., after the news report ends on the radio during his morning commute, John may immediately switch radio station, not wishing to hear the song playing out after the news).

The server 220 updates the user history/profile (step 265), adding metadata tags $<TAG_1>$, $<TAG_2>$, ... to the user profile. As will be explained below, tags $<TAG_1>$, $<TAG_2>$, ... are metadata tags associated with content item $CI_1$. The user profile therefore stores a topical history of the user's content item consumption, by storing the metadata tags of each content item consumed by the user.

At some point after the user 205 starts to consume (step 250) $CI_1$, the user 205 finishes consuming $CI_1$ (step 268). The first device 210 notifies the server 220 that the user 205 has finished consuming $CI_1$ (step 270).

The steps described until this point may be repeated, either in their entirety or in part. For instance, and without limiting the generality of the foregoing, if the user 205 proceeds to consume a different content item immediately after consuming content item $CI_1$, then there is no need to return all the way to the step of turning the first device on (step 225). Similarly, persons of skill in the art will appreciate that others of the steps enumerated above may be omitted or performed only from time-to-time.

The user 205 interfaces with first device 210 in order to start consuming content item $CI_2$ (step 275). The first device 210 notifies the server 220 that the user 205 has started consuming $CI_2$ (step 280). As noted above, in some embodiments of the present invention, there might be a delay before executing step 280.

The server 220 updates the user profile (step 285), adding metadata tags $<TAG_M>$, $<TAG_N>$, ... to the user profile. As will be explained below, tags $<TAG_M>$, $<TAG_N>$, ... are metadata tags associated with content item $CI_2$.

For whatever reason, the steps of the user 205 finishing consuming $CI_2$ (corresponding to step 268 for $CI_1$), is never reached. Therefore, first device 210 never notifies the server 220 that the user 205 has finished consuming $CI_2$ (corresponding to step 270 for $CI_1$). For instance, and without limiting the generality of the foregoing, the user 205 might have arrived at his destination and therefore switched off the first device 210.

When the user 205 turns on the second device 215 (step 288), the second device 215 sends a get playlist request (step 290) to the server 220 (corresponding to step 230 for first device 210). The server 220 generates a playlist (step 295) for the second device 210 (corresponding to step 235). The playlist is sent (step 300) from the server 220 to the second device 205.

After receiving the playlist sent from the server 220 to the second device 215, the user 205 is able to start consuming content item $CI_2$ (step 305).

The two steps 235, 295 of generating a playlist for user 205 are performed by the server by querying a database of content items in order to compile a list of content items which are associated with metadata tags (such as tags $<TAG_1>$, $<TAG_2>$, ..., $<TAG_M>$, $<TAG_N>$, and so forth) which appear in the user profile/history of user 205. The resulting list of content items is formed into the playlist, based, at least in part, on the following criteria:

a) including a content item which has been started but not completely consumed;

b) not including content items marked in a record of acquired user history as being completely consumed (i.e. finished consuming, as per step 270), unless said content items have changed with respect to the version consumed; and c) including content items which have not been consumed.

When a content item is related to a current topic of interest, for instance, in keeping with the example above of John and the ongoing gubernatorial election campaign, if the content item has changed, then that content item is related to by the playlist building mechanism as though that content item had not been viewed. For instance if in an earlier report a candidate's gaffe was mentioned, and that report was marked as consumed by John, and later in the day the report was modified to highlight that the candidate had retracted her statement, was misunderstood by the press, and so forth, then the report would typically now be marked as not consumed by John.

A news editor may manually tag each new update with a version tag, thereby indicating that each update is different than earlier versions. Each version can be compared to the latest version that John has consumed, and if John has not viewed the latest version (e.g. John has consumed version 2 and not yet consumed version 3), the latest version can be added to John's playlist.

Alternatively, the versions of content items can, where appropriate, be based on time. For example, and without limiting the generality of the foregoing, if a news story about the ongoing gubernatorial election campaign is broadcast twelve hours after it was viewed by John, it can assumed to still be current, and therefore, as having not been updated, even though the metadata tags have not changed with respect to earlier versions.

Alternatively, versions of content can be compared by tag/keyword comparison. The system may determine if the new story contains newer information than the older one. For example, and without limiting the generality of the foregoing, the metadata tags associated with the story are compared. There is a significant match expected between different versions of the same story, otherwise the system would not assume the stories were related to begin with. On the other hand, by analyzing the difference in the metadata tags or keywords, the system might judge the newer version of the story to have some new information. Therefore, the new version would be added to John's playlist.

Still further alternatively, cloud/crowd-sourcing may be used for versioning content items. Since other users who consumed media article A later opted to consume media article B (which share keywords/metadata tags), the system assumes that B is an extension of A containing new info.

The server 220 further maintains a list of devices which are associated with the user 205, thereby enabling sending of customized playlists for the user 205 only to the first device 210 and the second device 215, while not sending the user specific customized playlist to a third device (not depicted) with which the user is not associated.

It is appreciated that, if the selected at least one content item is not suitable for consumption on the at least one of the plurality of user devices, then a next item in the playlist is pushed to the least one of the plurality of user devices. By way of example, and without limiting the generality of the foregoing, content intended to be played out on a television is not to be played out on a radio. Similarly, web browser content is not to be rendered on a radio, and so forth.

For each of the first device 210 and the second device 215, a content item is pushed to the device for consumption by a media server located at one of the content providers 160*a*, 160*b*, and 160*c* (FIG. 1). The media server may be the same server as server 220, a local PVR, or may be a different server, using techniques known in the art. The media server sends the content item to whichever of the first device 210 and the second device 215 requests the content item, based on the user playlist.

Figure 3:
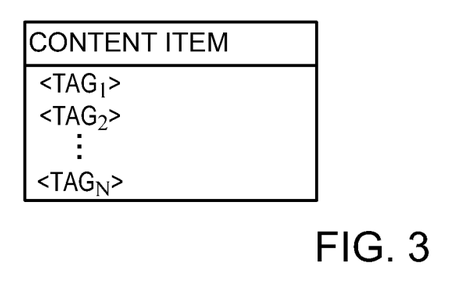
FIG. 3 is a depiction of an exemplary content item record within the system of FIG. 1.

Reference is now made to FIG. 3, which is a depiction of an exemplary content item record within the system of FIG. 1. Each content item is associated with a plurality of metadata tags relating to the content of the content item. For instance, a news report viewed by John reporting on a speech made by Mary Smith, one of the candidates in the gubernatorial election, may be tagged with the metadata tags:

---
<Elections>;
<Kansas state elections>;
<Mary Smith>;
<Taxes>;
<Candidate speeches>;
And so forth.
---

John's history or profile would then be updated (as per steps 265 and 285 of FIG. 2) to record that John has, through his content item consumption practices, expressed interest in the above mentioned areas. When the server (220, FIG. 2) generates a playlist for John (steps 265 and 285 of FIG. 2) other content items having the same metadata tags could then be included in the playlist—taking into account the other factors mentioned above when describing the building of the playlist.

It is appreciated that the user profile may be subject to user input and editing. For instance, there might be an interface allowing the user to emphasize certain topics and deemphasize other topics. For instance, and without limiting the generality of the foregoing, a webpage may enable the user to mark certain content items or certain topics (indicated by metadata tags) as topics to be continued or ignored.

The metadata tagging of content items can be performed by content providers using techniques known in the art to associate related content items. For instance, news aggregator websites identify and present news articles posted on websites topically.

Figure 4:
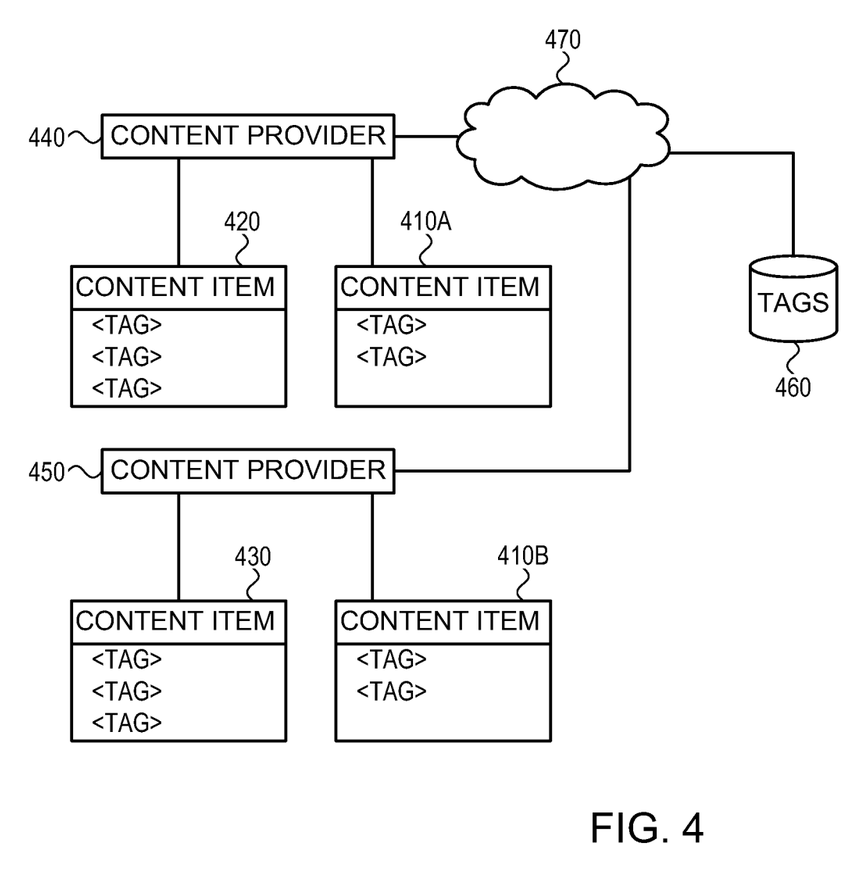
FIG. 4 is a depiction of various content item records associated with a single content provider and a database of tags for use by various content providers utilizing the system of FIG. 1.

Reference is now made to FIG. 4, which is a depiction of various content item records associated with a single content provider and a database of tags for use by various content providers utilizing the system of FIG. 1. In order to ensure that metadata tags are the same, so that two identical content items 410*a*, 410*b* or two similar or related content items 420, 430 are tagged with the same metadata tags by different content providers 440, 450, a central database 460 of metadata tags is maintained in a manner so as to be accessible to all of the content providers 440, 450 (and also 160*a*, 160*b*, 160*c*, FIG. 1) using the system. For instance, and without limiting the generality of the foregoing, the database 460 may be accessible to all of the content providers 440, 450 (and also 160*a*, 160*b*, 160*c*, FIG. 1) using the system over a network connection 470, such as the Internet, an intranet, wide- or metropolitan-area network. In order to protect access to the database 460 and ensure that only authorized content providers 440, 450 (and also 160*a*, 160*b*, 160*c*, FIG. 1) access the database 460, the database 460 may require password access. Additionally, communications between the database 460 and the content providers 440, 450 (and also 160*a*, 160*b*, 160*c*, FIG. 1) may be encrypted. Only authorized content providers 440, 450 (and also 160*a*, 160*b*, 160*c*, FIG. 1) would have keys enabling communication with the database 460.

Figure 5:
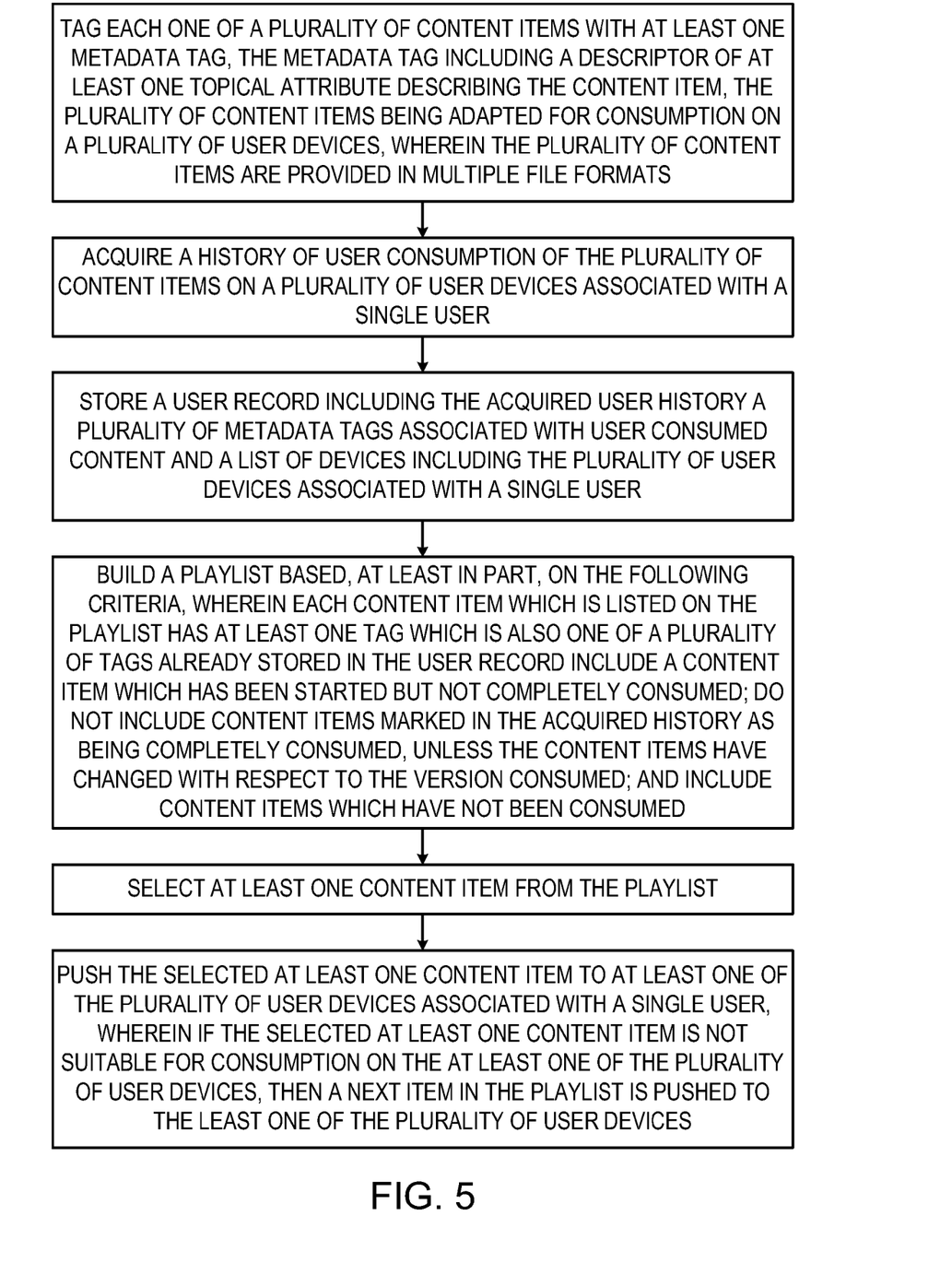
FIG. 5 is a simplified flowchart diagram of methods of operation of the system of FIG. 1.

Reference is now made to FIG. 5, which is a simplified flowchart diagram of preferred methods of operation of the system of FIG. 1. The method of FIG. 5 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for media consumption, the method comprising:

tagging each one of a plurality of content items with at least one metadata tag, the metadata tag comprising a descriptor of at least one topical attribute describing the content item, the plurality of content items being adapted for consumption on a plurality of user devices, wherein the plurality of content items are provided in multiple file formats;

acquiring a history of user consumption of the plurality of content items on a plurality of user devices associated with a single user;

storing a user record comprising:
  the acquired user history;
  a plurality of metadata tags, each tag comprising a descriptor of at, least one topical attribute describing the content item that is associated with user consumed content; and
  a list of devices comprising the plurality of user devices associated with a single user;

building a playlist at a server, the playlist based, at least in part, on the following criteria, wherein each content item which is listed on the playlist has at least one tag which is also one of a plurality of tags already stored in the user record:
  a) including a content item which has been started but not completely consumed;

b) not including content items marked in the acquired history as being completely consumed, unless said content items have changed with respect to the version consumed; and c) including content items which have not been consumed;

selecting at least one content item from the playlist; and pushing the selected at least one content item to at least one of the plurality of user devices associated with a single user from a media server, wherein if the selected at least one content item is not suitable for consumption on the at least one of the plurality of user devices, then a next item in the playlist is pushed to the least one of the plurality of user devices.

2. The method according to claim 1 wherein each one of the content items comprises a content item in one of the following formats:

AVI, DIV, MP4, MPEG, MPG, WMV, and RM files;
MP3, M4A, MIDI, and WAV files; and
HTML, XML, DOC, and PDF files.

3. The method according to claim 1 wherein at least one of the plurality of user devices associated with the single user comprises one of:

an e-reader device; a tablet computer; a smart phone; a car radio; a vehicular based infotainment center; an Internet radio; a television set; a personal computer; and a personal video recorder.

4. The method according to claim 1 wherein metadata tags are stored in a database of metadata tags.

5. The method according to claim 1 wherein the user record is stored at a remote server.

6. The method according to claim 1 wherein the playlist is built at a remote server.

7. The method according to claim 1 wherein the playlist is customized according to the least one of the plurality of user devices associated with a single user.

8. A system for media consumption, the system comprising:

a metadata tagger which tags each one of a plurality of content items with at least one metadata tag, the metadata tag comprising a descriptor of at least one topical attribute describing the content item, the plurality of content items being adapted for consumption on a plurality of user devices, wherein the plurality of content items are provided in multiple file formats;

a user history of user consumption of the plurality of content items on a plurality of user devices associated with a single user;

a store for storing a user record comprising:
the acquired user history;
a plurality of metadata tags comprising a descriptor of at least one topical attribute describing the content item that is associated with user consumed content; and
a list of devices comprising the plurality of user devices associated with a single user;

a playlist builder for building a playlist at a server, the playlist based, at least in part, on the following criteria, wherein each content item which is listed on the playlist has at least one tag which is also one of a plurality of tags already stored in the user record:

a) including a content item which has been started but not completely consumed;

b) not including content items marked in the acquired history as being completely consumed, unless said content items have changed with respect to the version consumed; and c) including content items which have not been consumed;

a selector to select at least one content item from the playlist; and a content pusher to push the selected at least one content item to at least one of the plurality of user devices associated with a single user from a media server, wherein if the selected at least one content item is not suitable for consumption on the at least one of the plurality of user devices, then a next item in the playlist is pushed to the least one of the plurality of user devices.

9. The system according to claim 8 wherein each one of the content items comprises a content item in one of the following formats:

AVI, DIV, MP4, MPEG, MPG, WMV, and RM files;
MP3, M4A, MIDI, and WAV files; and
HTML, XML, DOC, and PDF files.

10. The system according to claim 8 wherein at least one of the plurality of user devices associated with the single user comprises one of:

an e-reader device; a tablet computer; a smart phone; a car radio; a vehicular based infotainment center; an Internet radio; a television set; a personal computer; and a personal video recorder.

11. The system according to claim 8 wherein metadata tags are stored in a database of metadata tags.

12. The system according to claim 8 wherein the user record is stored at a remote server.

13. The system according to claim 8 wherein the playlist is built at a remote server.

14. The system according to claim 8 wherein the playlist is customized according to the least one of the plurality of user devices associated with a single user.

15. A system for media consumption, the method comprising:

means for tagging each one of a plurality of content items with at least one metadata tag, the metadata tag comprising a descriptor of at least one topical attribute describing the content item, the plurality of content items being adapted for consumption on a plurality of user devices, wherein the plurality of content items are provided in multiple file format;

means for acquiring a h y of user consumption of the plurality as content items on a plurality of user devices associated with a single user;

means for storing a user record comprising:
the acquired user history;
a plurality of metadata tags, each tag comprising a descriptor of at least one topical attribute describing the content item that is associated with user consumed content; and
a list of devices comprising the plurality of user devices associated with a single user;

means for building a playlist at a server, the playlist based, at least in part, on the following criteria, wherein each content item which is listed on the playlist has at least one tag which is also one of a plurality of tags already stored in the user record:

a) including a content item which has been started but not completely consumed, b) not including content items marked in the acquired history as being completely consumed, unless said content items have changed with respect to the version consumed; and
c) including content items which have not been consumed;

means for selecting at least one content item from the playlist; and means for pushing the selected at least one content item to at least one of the plurality of user devices associated with a single user from a media server, wherein if the selected at least one content item is not suitable for consumption on the at least one of the plurality of user devices, then a next item in the playlist is pushed to the least one of the plurality of user devices.

* * * * *

UNITED STATES PATENT AND TRADEMARK OFFICE
CERTIFICATE OF CORRECTION

PATENT NO. : 9,762,687 B2  
APPLICATION NO. : 14/407969  
DATED : September 12, 2017  
INVENTOR(S) : Avraham Poupko et al.

Page 1 of 1

It is certified that error appears in the above-identified patent and that said Letters Patent is hereby corrected as shown below:

Column 10, Line 56, Claim 1, "at, least" to read as --at least--.

Column 12, Line 49, Claim 15, "format;" to read as --formats;--.

Column 12, Line 50, Claim 15, "h y" to read as --history--.

Column 12, Line 51, Claim 15, "plurality as" to read as --plurality of--.

Column 12, Line 67, Claim 15, "consumed," to read as --consumed;--.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*